United States Patent

Weldy et al.

Patent Number: 6,149,220
Date of Patent: Nov. 21, 2000

[54] COVER ASSEMBLY FOR THE CARGO AREA OF A VEHICLE

[75] Inventors: Ross Weldy, Elkhart, Ind.; Jack G. Barben, Union, Mich.

[73] Assignee: Custom Creative Products, Inc., Elkhart, Ind.

[21] Appl. No.: 08/910,967

[22] Filed: Aug. 7, 1997

[51] Int. Cl.[7] ..................................................... B60P 7/02
[52] U.S. Cl. ........................... 296/100.06; 296/100.07; 296/100.08
[58] Field of Search ......................... 296/100.06, 100.07, 296/100.1, 100.08

[56] References Cited

U.S. PATENT DOCUMENTS

| | | |
|---|---|---|
| 1,298,733 | 4/1919 | King . |
| 2,531,140 | 11/1950 | Linde ................................ 296/100.08 |
| 2,562,300 | 7/1951 | Dingman . |
| 2,591,186 | 4/1952 | Neitzke . |
| 2,771,319 | 11/1956 | Renquist . |
| 2,886,375 | 5/1959 | Crawford .......................... 296/100.07 |
| 2,969,284 | 1/1961 | Ambli . |
| 3,151,908 | 10/1964 | Horst . |
| 3,155,423 | 11/1964 | Cripe ................................ 296/100.08 |
| 3,231,305 | 1/1966 | Beckman . |
| 3,363,938 | 1/1968 | Schultz . |
| 3,367,347 | 2/1968 | Smith . |
| 3,578,378 | 5/1971 | Anderson . |
| 3,649,073 | 3/1972 | Whittemore ...................... 296/100.08 |
| 3,675,885 | 7/1972 | Shute ............................... 296/100.8 X |
| 3,727,972 | 4/1973 | Belk . |
| 3,762,762 | 10/1973 | Beveridge et al. ............ 296/100.07 X |
| 3,765,716 | 10/1973 | Van Gompel ...................... 296/100.08 |
| 3,773,379 | 11/1973 | Loiseau . |
| 3,785,698 | 1/1974 | Dean et al. .................... 296/100.07 X |
| 3,901,548 | 8/1975 | Seaman, Jr. . |
| 3,923,334 | 12/1975 | Key ................................ 296/100.07 X |

(List continued on next page.)

FOREIGN PATENT DOCUMENTS 69247 9/1991 Canada .

OTHER PUBLICATIONS

SnugTop–Fiberglass Tonneau Covers–Custom Hardtops, 1711 Harbor Ave. P.O. Box 121, Long Beach,CA 90801–Advertisement.

SnugTop–Fiberglass Tonneau Covers, fiberglass pickup shells, tonneau covers and hardtops–Custom Hardtops, 1711 Harbor Ave. P.O. Box 121, Long Beach, CA 90801–Advertisement.

SngLid–Fiberglass Bed Covers–Manufactured by SnugTop, 1711 Harbor Avenue. P.O. Box 121, Long Beach, CA 90801–Advertisement.

"Introducing the Cap Shelf"—RRS Specialties, Inc., P.O. Box 38366, Sacramento, CA 95838—Advertisement.

(List continued on next page.)

Primary Examiner—Joseph D. Pape
Attorney, Agent, or Firm—Barnes & Thornburg

[57] ABSTRACT

A cover for the cargo area of a vehicle includes two rails secured to opposite sides of the cargo area of the vehicle. A cover material is bounded by four peripheral rails. Two of the rails have the same cross-section and are located on two sides of the cover material. The other two rails are of a different configuration and are located on other two sides of the cover. A biasing member, such as a torsion bar, is inserted into the ends of each of the rails secured to the vehicle bed. The opposite end of the torsion bar is located in and slides within a cylinder. The opposite end of the cylinder includes a slide member. The slide members are located in channels formed in two of the rails. In the closed position, latches engage the torsion bars and hold the cover in place. To open the cover, two of the latches are disengaged, thereby allowing the cover to rise in response to the force of the biasing members. The cover pivots about a hinge formed by the engagement of the secured latches with the torsion bars.

27 Claims, 12 Drawing Sheets

U.S. PATENT DOCUMENTS

| | | |
|---|---|---|
| 4,036,521 | 7/1977 | Clenet . |
| 4,168,096 | 9/1979 | Langston . |
| 4,181,351 | 1/1980 | Spanke .................. 296/100.07 |
| 4,221,423 | 9/1980 | Stone . |
| 4,273,377 | 6/1981 | Alexander . |
| 4,284,303 | 8/1981 | Hather . |
| 4,310,194 | 1/1982 | Biller . |
| 4,516,802 | 5/1985 | Compton . |
| 4,522,440 | 6/1985 | Gostomski .............. 296/100.07 X |
| 4,547,014 | 10/1985 | Wicker . |
| 4,607,876 | 8/1986 | Reed . |
| 4,629,243 | 12/1986 | Jensen .................. 296/100.07 |
| 4,639,033 | 1/1987 | Wheatley et al. . |
| 4,730,866 | 3/1988 | Nett . |
| 4,739,528 | 4/1988 | Allen . |
| 4,762,360 | 8/1988 | Huber . |
| 4,768,824 | 9/1988 | Andonian .................. 296/165 |
| 4,792,179 | 12/1988 | Stevens . |
| 4,799,299 | 1/1989 | Campbell . |
| 4,807,921 | 2/1989 | Champie, III et al. . |
| 4,819,981 | 4/1989 | Moe et al. .............. 296/100.07 X |
| 4,861,092 | 8/1989 | Bogard . |
| 4,936,724 | 6/1990 | Dutton . |
| 5,018,777 | 5/1991 | Swenson et al. .......... 296/100.07 |
| 5,076,338 | 12/1991 | Schmeichel et al. . |
| 5,102,185 | 4/1992 | Lake .................. 296/100.07 |
| 5,121,960 | 6/1992 | Wheatley . |
| 5,203,364 | 4/1993 | Koole .................. 296/100.08 X |
| 5,207,470 | 5/1993 | Rafi-Zadeh ............ 296/100.08 X |
| 5,503,450 | 4/1996 | Miller .................. 296/100.08 |
| 5,540,475 | 7/1996 | Kersting et al. . |
| 5,595,418 | 1/1997 | Medlin .................. 296/100.08 |
| 5,704,681 | 1/1998 | Lambden ................ 296/100.06 |
| 5,904,393 | 5/1999 | Yoder .................. 296/100.07 X |

OTHER PUBLICATIONS

"New Products"–Trucking Times—Mar. 1993—p. 36—"Sport Masters, Inc. Introduces New Product"—frame mounted tonneau covers—"RRS Specialties Introduces New Truck Cap Utility Shelf".

"Fastback Flush–Mount Tonneau Cover"— Urban Industries, Inc. 1991—Advertisement.

"The Fastback Rigid Tonneau Cover" by Urban Industries, Inc.

Urban Industries, Inc. 1992—Fastback Flush–Mount Tonneau Cover—Correspondence.

COVER ASSEMBLY FOR THE CARGO AREA OF A VEHICLE

BACKGROUND AND SUMMARY OF THE INVENTION

The present invention relates to a cover assembly for the cargo area of a vehicle.

Various covers for vehicle cargo areas, often called tonneau covers, are known. Typically, these covers include a relatively soft, flexible fabric approximately the size and shape of the cargo area to be covered. The cover includes a mechanism disposed along the edge of the fabric for securing the fabric to the vehicle. In one known type of cover, holes are drilled in the vehicle and one portion of a snap is secured in each hole. The corresponding snap portions are secured about the perimeter of the flexible cover. To secure the cover to the vehicle, the fabric is placed over the cargo area and the snaps are engaged.

In another known type of cover, a plurality of rails are clamped about the periphery of the cargo area. The rails include snaps, slots or other features that engage corresponding features secured to the periphery of the flexible cover. In both of these types of soft covers, the snaps or other features are disengaged and the fabric is pulled back to provide access to the cargo area.

The present invention provides a cover for the cargo area of a vehicle that may be opened from one or more, including all, sides of the vehicle cargo area. In one embodiment of the present invention, a cover assembly for the cargo area of the vehicle includes a rail secured to the vehicle, a cover, a biasing member secured to the rail and to the cover and a latch for selectively holding the cover in the closed position against the force of the biasing member or allowing the cover to open in response to the force of the biasing member. The rail includes a channel into which a portion of the biasing member extends. The biasing member may include a torsion bar. In one embodiment of the invention, the cover assembly further includes a cylinder and a portion of the torsion bar is located in the cylinder and slides within the cylinder. A lock may be included.

In another embodiment of the present invention, a cover assembly for the cargo area of a vehicle includes a plurality of first rails adapted to be secured to the vehicle, a cover, a plurality of second rails connected to the cover and a biasing member secured to at least one of the first rails and at least one of the second rails. One of the first rails may include a channel into which a portion of the biasing member extends. The biasing member may include a torsion bar. The cover assembly may further include a cylinder and a portion of the torsion bar may be located within the cylinder and slide therein. At least one of the second rails may include a channel in which a portion of the biasing member is located.

In another embodiment of the invention, a cover assembly for the cargo area of a vehicle includes at least two first rails adapted to be secured to the vehicle, a cover having four sides, a plurality of second rails connected to two sides of the cover, a plurality of third rails connected to two sides of the cover and a plurality of corner pieces disposed between the second and third rails, and a plurality of biasing members, at least one connected to one of the first rails and one of the third rails.

In other embodiments of the present invention, certain of the various rail members may be connected by corner pieces. The corner pieces may include projections that extend into channels in the rail members to be connected.

In other embodiments, the first rails may include bearing members. The bearing members may include portions that extend into channels in the first rails.

In another embodiment of the invention, a cover assembly for the cargo area of a vehicle includes a cover attached to the vehicle, one or more latches for selectively holding the cover in a closed position over the cargo area of the vehicle when at least one of the latches is engaged and permitting the cover to be opened from at least two sides of the cargo area when one or more of the latches is released and a support member for holding the cover in the open position. In other embodiments, the cover may be opened from any, or all, sides of the vehicle. One or more of the latches may pivot about a biasing member when the cover is opened.

The cover may be rigid. The cover assembly may include a lock, which may operate one or more of the latches. The support member may include a strut. The cover assembly may also include a biasing member for automatically raising the cover when one or more of the latches is released. The biasing member may include a torsion bar with a portion located in a cylinder.

In another embodiment of the invention, a cover assembly for the cargo area of a vehicle having a plurality of sides includes a rigid cover having the same number of sides as the cargo area of the vehicle and more than one side of the cover is selectively movable from a closed position adjacent a side of the cargo area of the vehicle and an open position away from a side of the cargo area of the vehicle. The cover assembly may include a biasing member secured to the cover. A latch or lock may also be included. Rails may be secured to the vehicle and/or the cover.

Other features of the present invention will be apparent from the following detailed description of the preferred embodiments and accompanying drawings.

DETAILED DESCRIPTION OF THE PREFERRED EMBODIMENTS

In FIGS. 1–4 it can be seen that the cover assembly of the present invention generally includes a pair of side rails 10 secured to the side rails of the cargo bed 20 of the vehicle, four support members 30, one extending from each end of side rails 10 and a cover 40.

Figure 5:
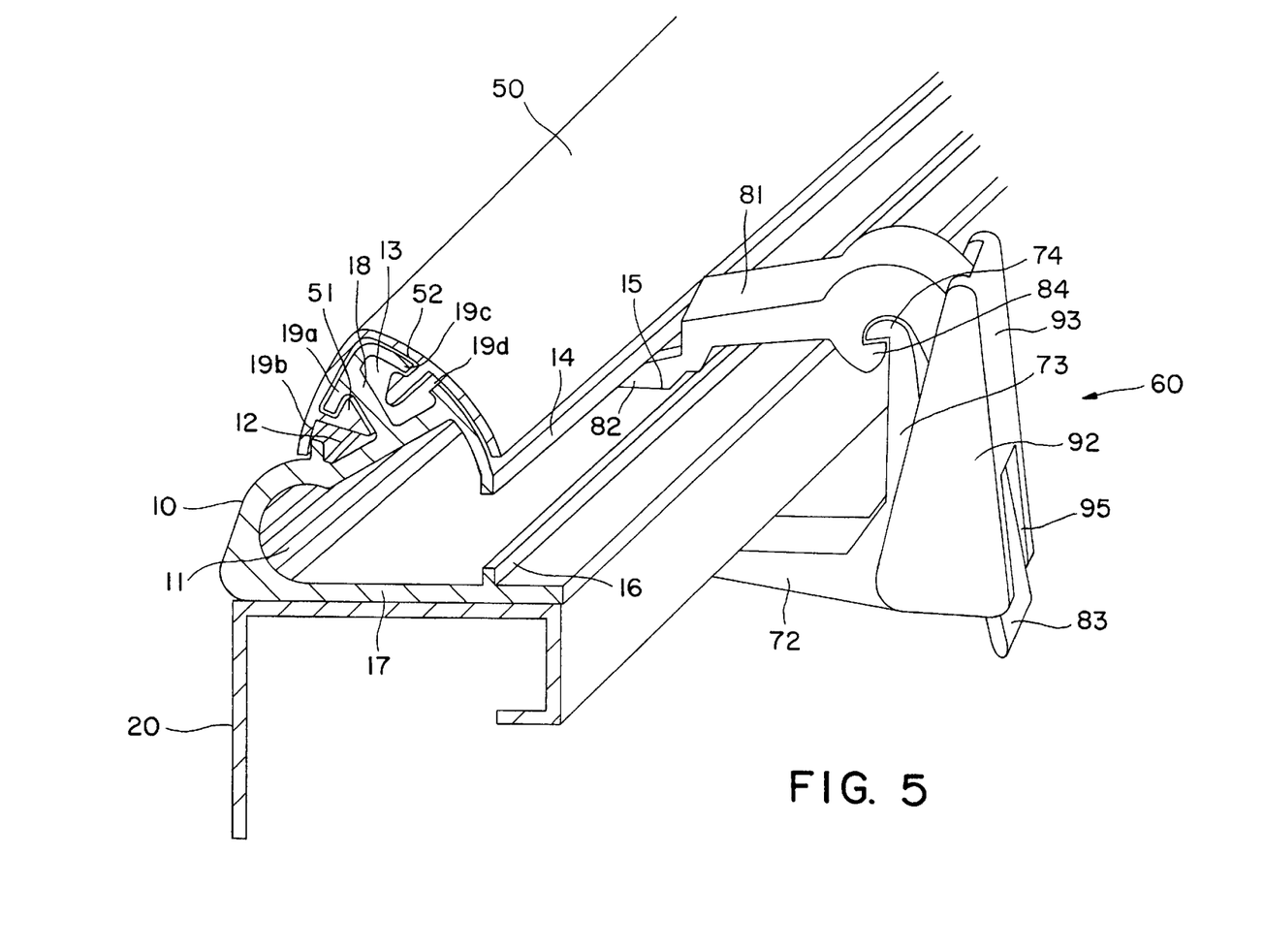
FIG. 5 is a cross-sectional and partial perspective view taken along line 5—5 in FIG. 1.

Side rails 10 each include a first channel 11, a second channel 12 and a third channel 13 (FIG. 5). Channel 11 includes a side wall 14 with a slit 15 therein that defines a lip 16 extending from the base 17 of side rail 10. Channels 12 and 13 share a common side wall 18. Channel 12 further includes an outer wall 19a with a slit 19b therein. Channel 13 includes an outer wall 19c with a slit 19d therein. Side rails 10 are preferably formed from metal, such as aluminum.

A plastic bearing member 50 having an inner contour corresponding approximately to the outer contour of walls 14, 19a, and 19c of side rail 10 is secured to side rail 10. This is accomplished by inserting a pair of ears or tabs 51 and 52 into channels 12 and 13 through slits 19b and 19d so as to engage outer walls 19a and 19c as shown. When the cover is opened from either of the sides of the cargo bed, it pivots on bearing member 50, as described below.

Figure 6:
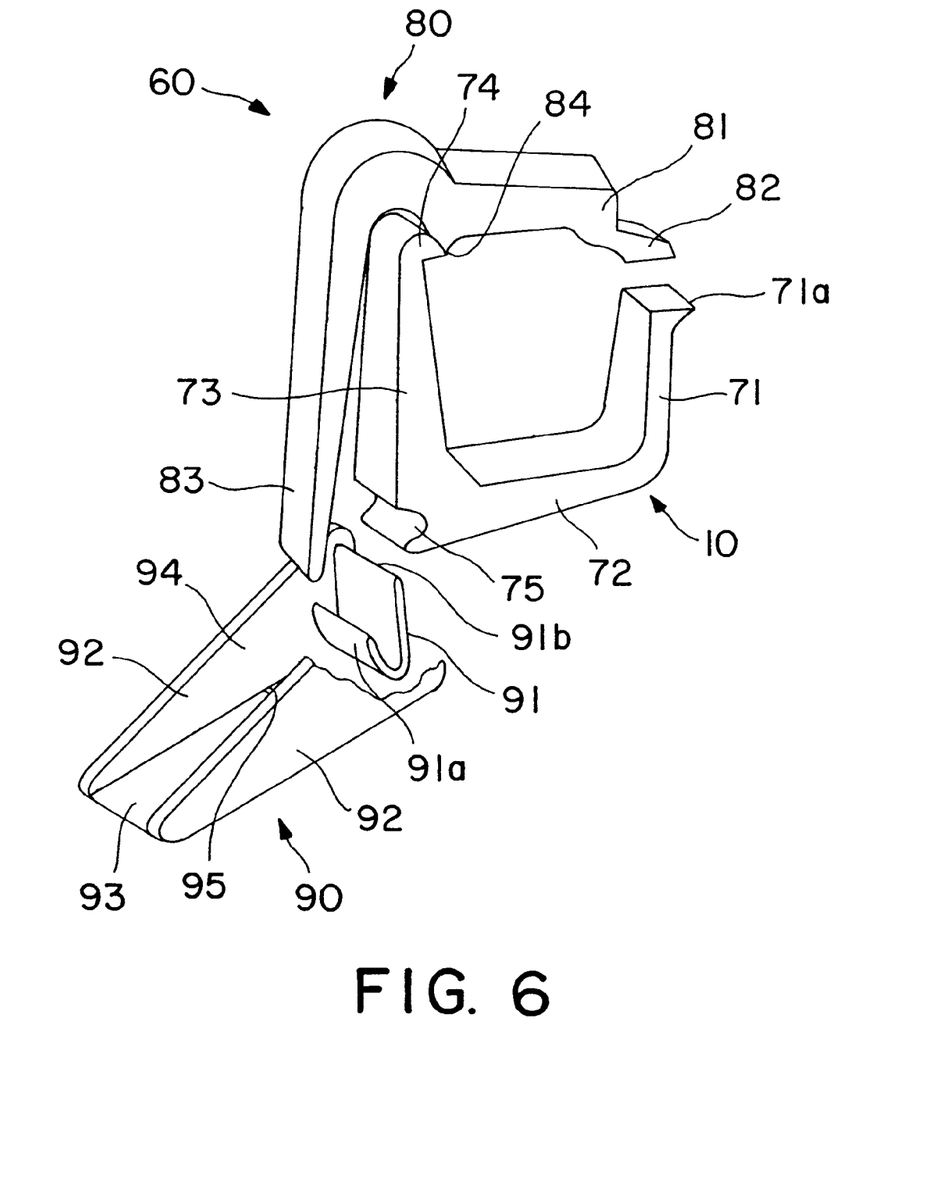
FIG. 6 is an exploded perspective view of a clamp that is a component of the present invention.

Side rails 10 are secured to the top rail of cargo bed 20 by a plurality of clamps 60 (FIGS. 5 and 6). Each clamp 60 generally includes a base portion 70, a top portion 80 and a lever 90. Base 70 includes a first arm 71, a second arm 72 disposed at a generally 90° angle to first arm 71, and a third arm 73 disposed at a generally 90° angle to second arm 72 and parallel to first arm 71. First arm 71 terminates in a foot 71a. Third arm 73 terminates in a hook 74. A recess 75 is formed at the juncture of second arm 72 and third arm 73.

Top portion 80 includes a first arm 81 terminating in a foot 82 at one end thereof. The opposite end of arm 81 is integrally formed with a second arm 83 that extends at a generally right angle thereto. A hook portion 84 extends from first arm 81 near its juncture with second arm 83.

As shown in the cut-away portion of FIG. 6, each lever 90 includes a base 91 that extends upwardly and rearwardly at an angle and transitions into a curved camming surface 91a. Levers 90 further include a pair of opposing side walls 92, a rear wall 93 and an open front 94. Rear wall 93 does not extend the entire length of side walls 92 and leaves an opening 95 at the rear of lever 90.

To secure side rail 10 to cargo bed 20, base 17 of side rail 10 is positioned adjacent the top rail as shown. Arm 71 is then positioned beneath the top rail such that arm 72 extends into the vehicle cargo area. The front edge 91b of base 91 of lever 90 is positioned in recess 75. Second arm 83 of top portion 80 is inserted through lever 90 as shown such that it extends through opening 95 and hook 84 engages hook 74. Foot 82 of first arm 81 is positioned behind lip 16 such that first arm 81 extends through slot 15. Lever 90 is then pivoted upwardly to the position shown in FIG. 5. As this occurs, second arm 83 rides along camming surface 91a and base 91 pushes second arm 83 away from third arm 73. This causes top portion 80 to pivot around the juncture of hooks 74 and 84 and produces a resultant downward and outward force on rail 10 along the area of contact between foot 71a and foot 82 with base 17.

Although a specific clamp is disclosed for securing rail 10 to the vehicle, it should be understood that numerous other clamping mechanisms may be utilized. However, as will be discussed below, a biasing member that forms a component of the present invention is secured to rail 10. The tension in the biasing member tends to cause rail 10 to lift off of the top rail of the vehicle cargo area. Accordingly, a clamp must be used that has sufficient clamping strength to overcome this tendency of rail 10 to separate from the top rail of the vehicle. In the particular embodiment shown, this is accomplished by placing foot 82 farther back in channel 11 than would otherwise be needed if no biasing member were used. Note also that the particular embodiment of clamp 60 disclosed is a universal design in that it will accommodate the cargo area top rails of all presently available pick-up trucks.

Figure 7:
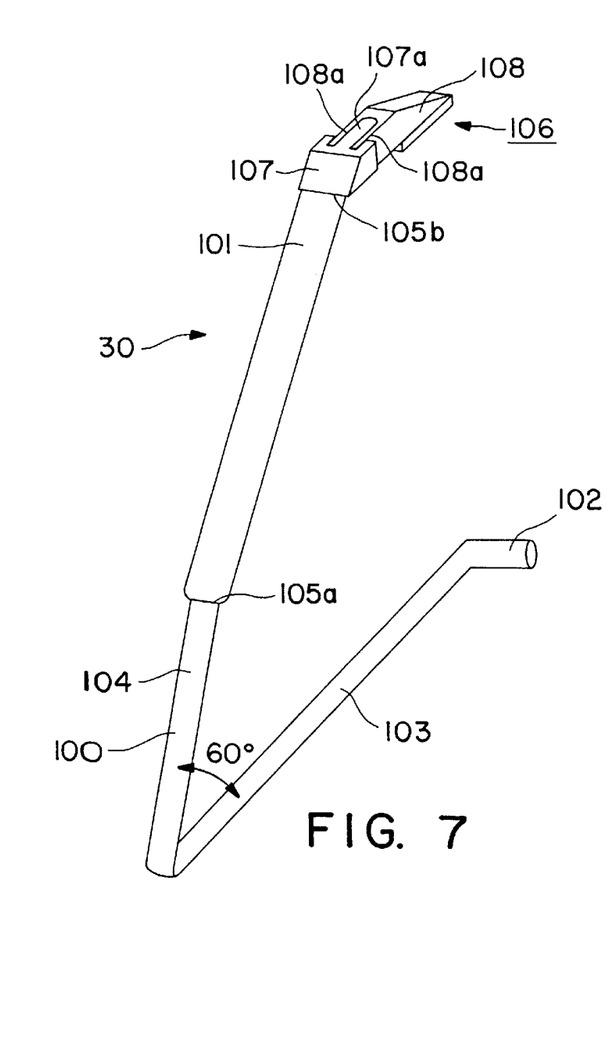
FIG. 7 is a perspective view of a support member that is a component of the present invention.

FIG. 7 shows a perspective view of a support member 30. In the embodiment shown, support member 30 is a strut, however, various support members could be used. Support member 30 includes a biasing member 100. In the embodiment shown, biasing member 100 is a torsion bar. Torsion bar 100 is received in a cylinder 101. Torsion bar 100 includes a first segment 102, a second segment 103 and a third segment 104. First segment 102 is disposed at a generally right angle to second segment 103 and lays in substantially the same plane as second segment 103. Third segment 104 is disposed at a substantially right angle to second segment 103 and lies in a plane angled approximately 60° from the plane in which second segment 103 lies.

Figure 8:
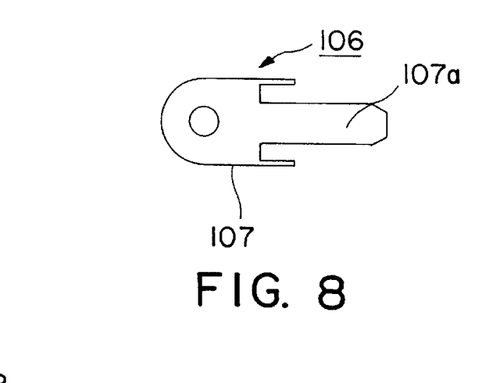
FIG. 8 is a top plan view of a portion of a slide that forms a component of the present invention.
Figure 9:
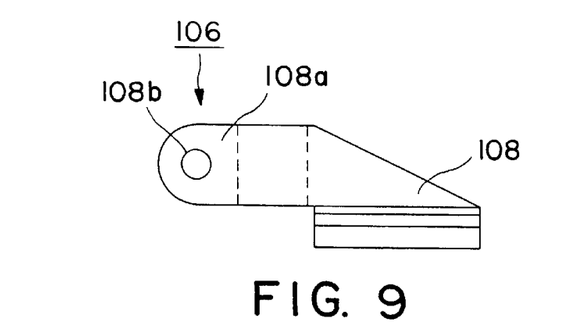
FIG. 9 is a side plan view of a portion of the slide that forms a component of the present invention.

Cylinder 101 includes a first open end 105a and a second end 105b with a slide 106 disposed thereon. Slide 106 (FIGS. 7–9) includes a cap 107 having an ear 107a extending therefrom. Slide 106 further includes a body 108 configured to slide within a portion of the periphery of the rigid cover, as described below. Body 108 includes, at one end thereof, a pair of arms 108a, each of which includes an opening 108b therein. Arms 108a are configured to straddle ear 107a as shown. A pin is then inserted through openings 108b and ear 107a to pivotally secure body 108 to cap 107.

Figure 10:
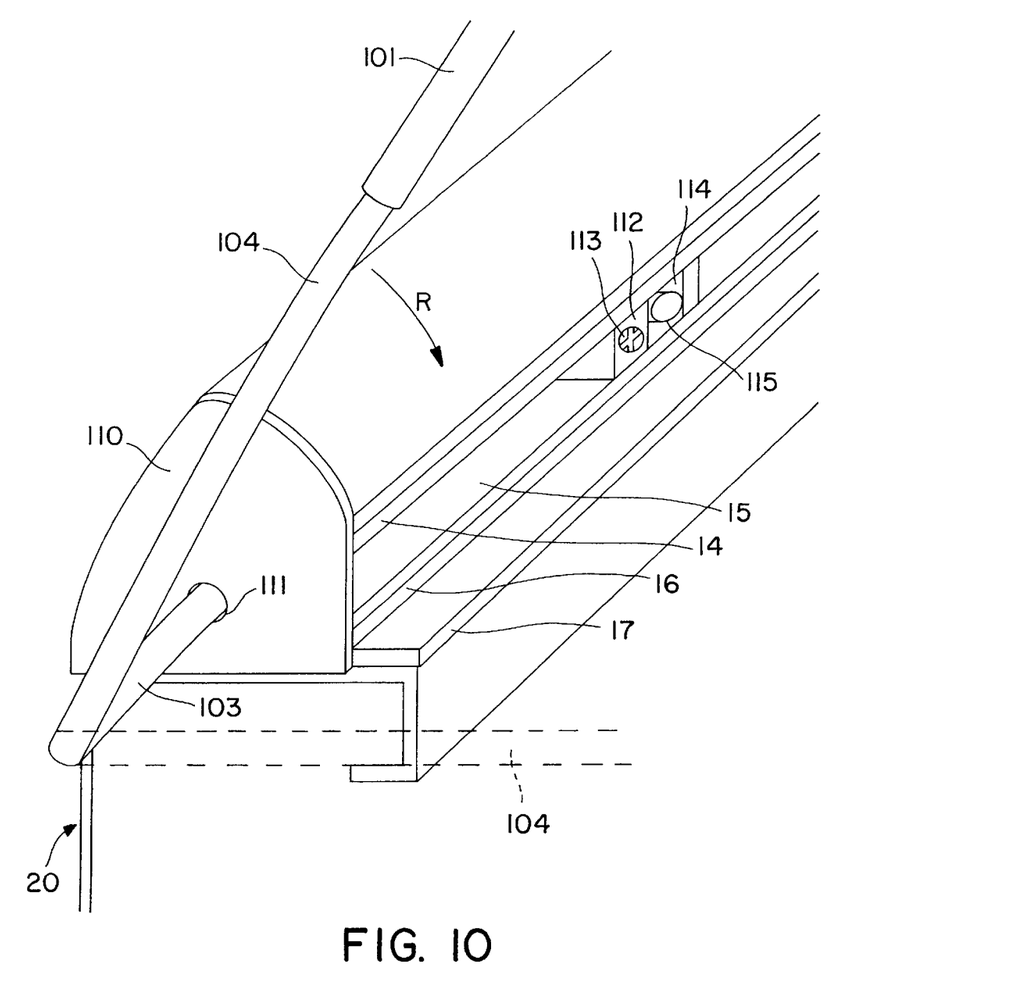
FIG. 10 is a perspective end view of the support member of FIG. 7 secured to a rail that is a component of the present invention.

FIG. 10 shows a perspective end view of side rail 10 with support member 30 secured thereto. As can be seen in this figure, an end cap 110 having an opening 111 therein has been placed on the end of side rail 10. Second segment 103 of torsion bar 100 extends through opening 111 and into channel 11 of side rail 10. A blocking member 112 is located in channel 11, adjacent slot 15, behind wall 14 and lip 16. Blocking member 112 is secured in place by a fastener, such as a screw 113. Blocking member 112 includes an opening 114 into which first segment 102 of torsion bar 100 extends. Blocking member 112 and end cap 110 secure support member 30 to side rail 10 such that torsion bar 100 cannot move along the longitudinal axis of channel 11. Note, however, that torsion bar 100 can be rotated in the direction of the arrow "R" such that third segment 104 is positioned as indicated by dashed lines in FIG. 10.

Figure 1:
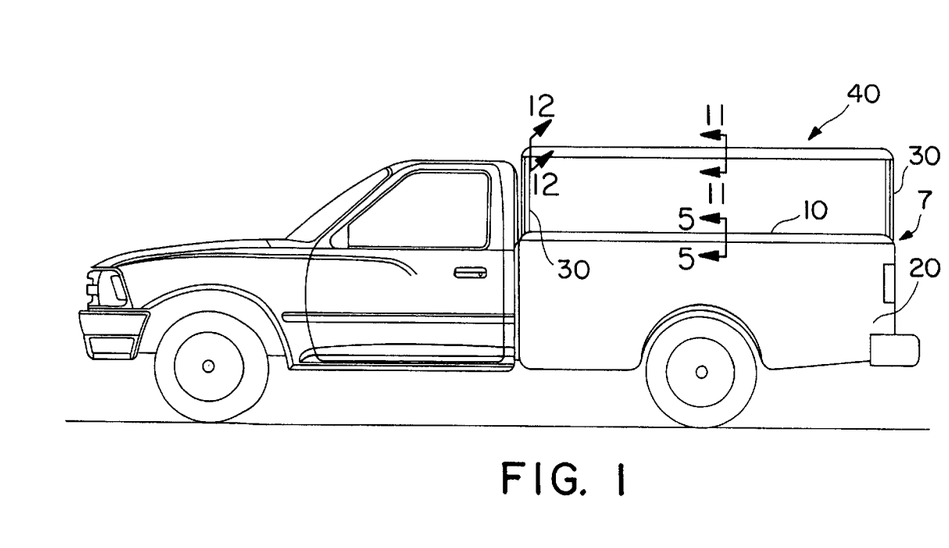
FIG. 1 is a side plan view of a cover assembly for the cargo area of a vehicle according to the present invention secured to a vehicle and raised from one side thereof.
Figure 2:
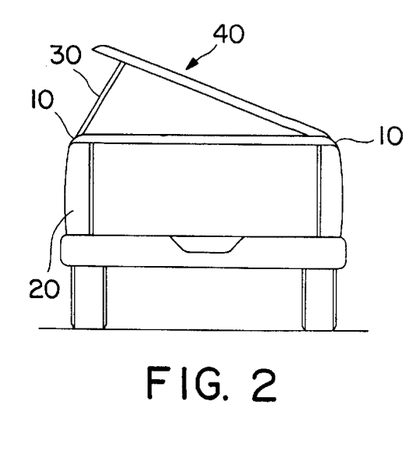
FIG. 2 is a rear plan view of FIG. 1.
Figure 3:
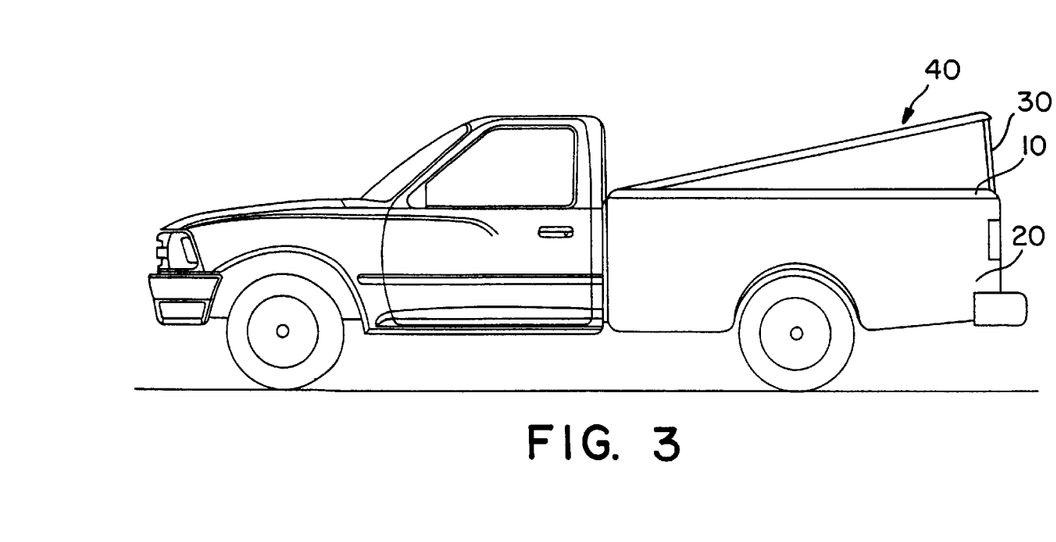
FIG. 3 is a side plan view of the cover assembly of FIG. 1 attached to a vehicle with the cover raised from the rear of the vehicle.
Figure 4:
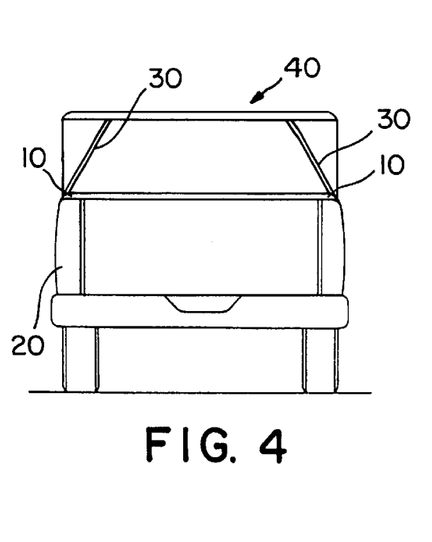
FIG. 4 is a rear plan view of FIG. 3.
Figure 11:
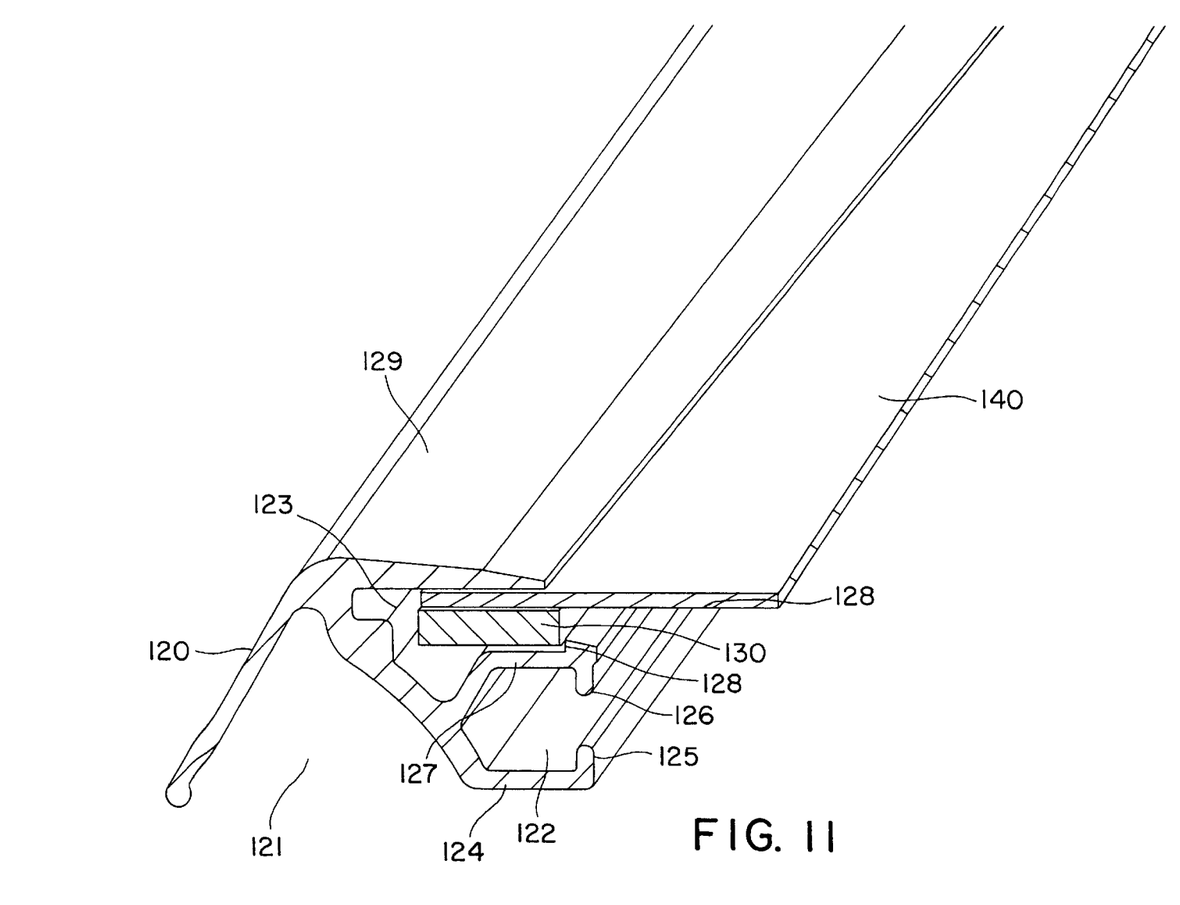
FIG. 11 is a cross-sectional and partial perspective view taken along line 11—11 in FIG. 1.

FIG. 11 is a cross-sectional and partial perspective view taken along line 11—11 in FIG. 1. This view illustrates a cross-sectional view of the periphery of cover 40. In particular, FIG. 11 illustrates rail 120 that extends along both sides of cover 40. Rail 120 includes a first channel 121, a second channel 122 and a third channel 123. Second channel 122 is bounded by base 124, first lip 125, second lip 126 and top wall 127. Top wall 127 includes a nib 128 extending therefrom. Rail 120 further includes a top wall 129 positioned above and spaced apart from top wall 127.

A cushion 130 is positioned between top wall 127 and cover material 140, adjacent nib 128. Cushion 130 is preferably a compressible material that expands in the position shown so as to press cover material 140 against the inner surface of top wall 129. This creates a seal between the upper surface of cover material 140 and the inner surface of top wall 129 and between cushion 130 and the upper surface of top wall 127 and helps keep the interior of the cargo area dry. Cushions 130 may be separate components placed between cover material 140 and rail 120. Alternatively, cushions 130 may be glued or otherwise secured to the underside of cover material 140. For example, cover material 140 could include a relatively rigid or stiff member with an outer covering wrapped around its edges. Cushions 130 could be placed on the underside of the rigid material and enclosed by the covering material.

Figure 12:
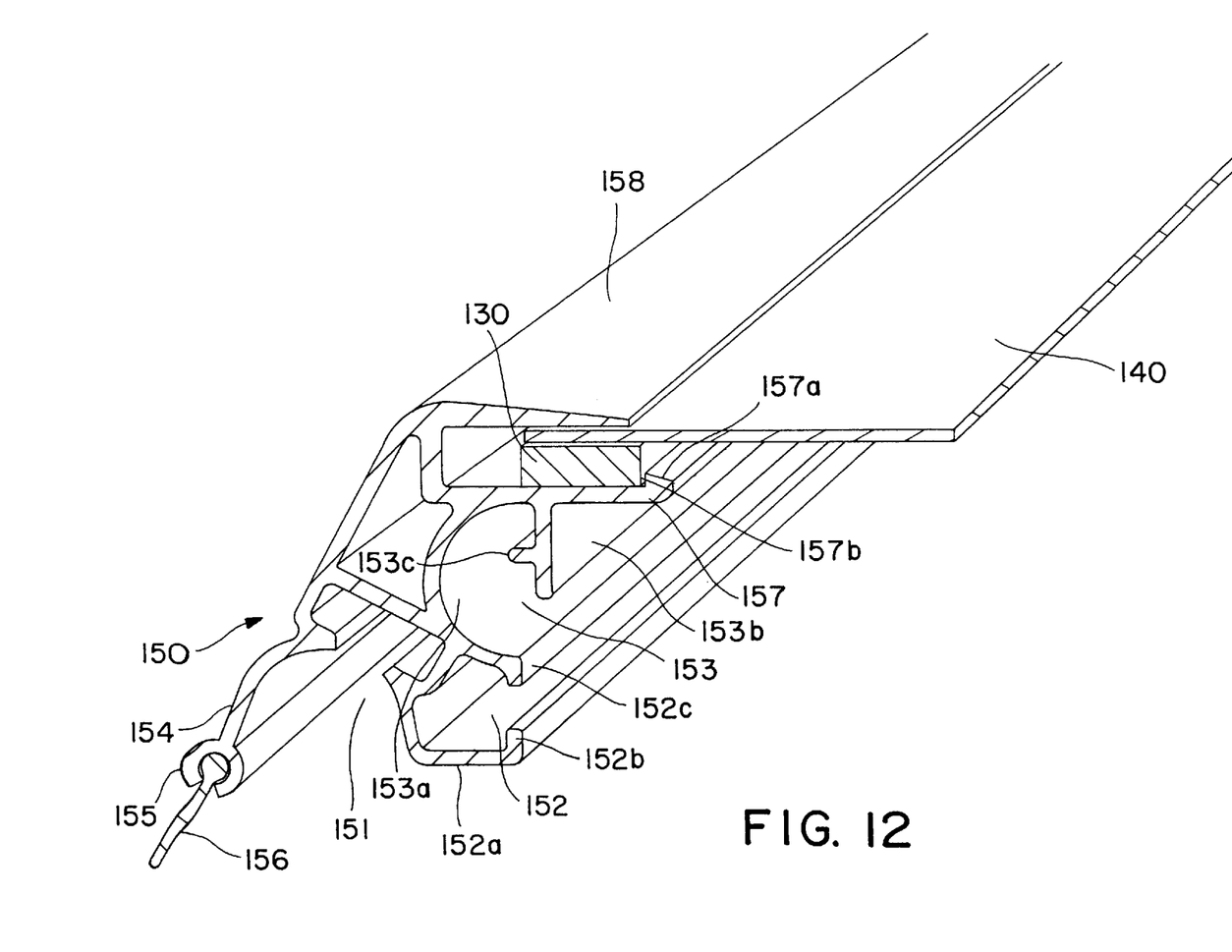
FIG. 12 is a cross-sectional and partial perspective view taken along line 12—12 in FIG. 1.

FIG. 12 is a cross-sectional and partial perspective view of rail 150 that extends along the front and rear of cover 40. Rail 150 includes a first channel 151, a second channel 152 and a third channel 153. Rear wall 154 of first channel 151 includes a slot 155 therein for receiving a seal 156. When cover 40 is lowered against the vehicle cargo bed, a seal 156 contacts the front and rear rails of the cargo bed and restricts the entry of moisture and debris. Second channel 152 is bounded by a base 152a, a first lip 152b, and a second lip 152c. Third channel 153 has a generally semicircular rear wall 153a and a vertically depending front wall 153b. A lip 153c extends into third channel 153 from vertically depending front wall 153b. Another wall 157 extends from vertically extending wall 153b and includes a nib 157a and recessed area 157b. Rail 150 further includes a top wall 158. Cover material 140 is secured to rail 150 in the same manner as rail 120, as shown.

In one embodiment of the invention, cover 40 is rigid. This may be accomplished in several ways. For example, cover material 140 can be a flexible material that is stretched taut between rails 120 and 150. Alternatively, cover material 140 may be a rigid material. As another alternative, if a sufficiently rigid material were used for cover 40, rails 120 and 150 could be completely eliminated.

Figure 13:
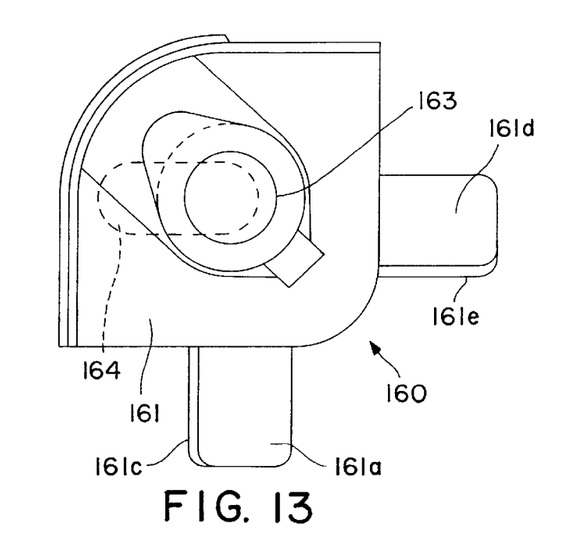
FIG. 13 is a top plan view of a corner piece that is a component of the present invention.
Figure 14:
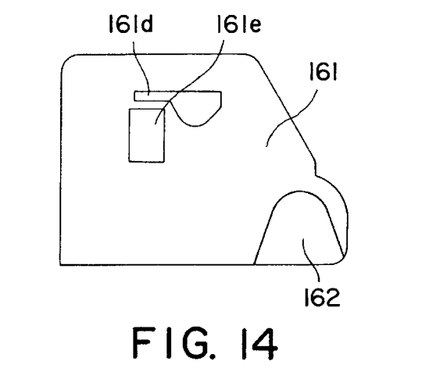
FIG. 14 is a plan view of one side of the corner piece shown in FIG. 13.
Figure 15:
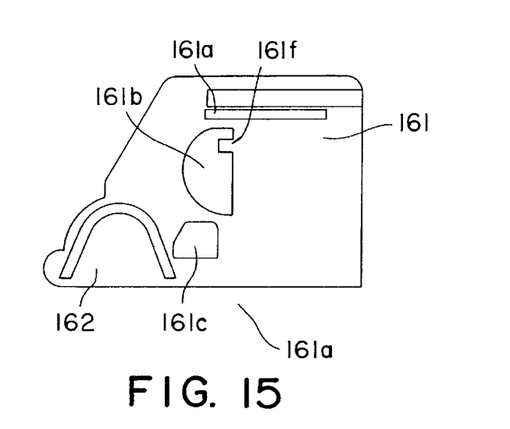
FIG. 15 is a plan view of another side of the corner piece shown in FIG. 13.
Figure 16:
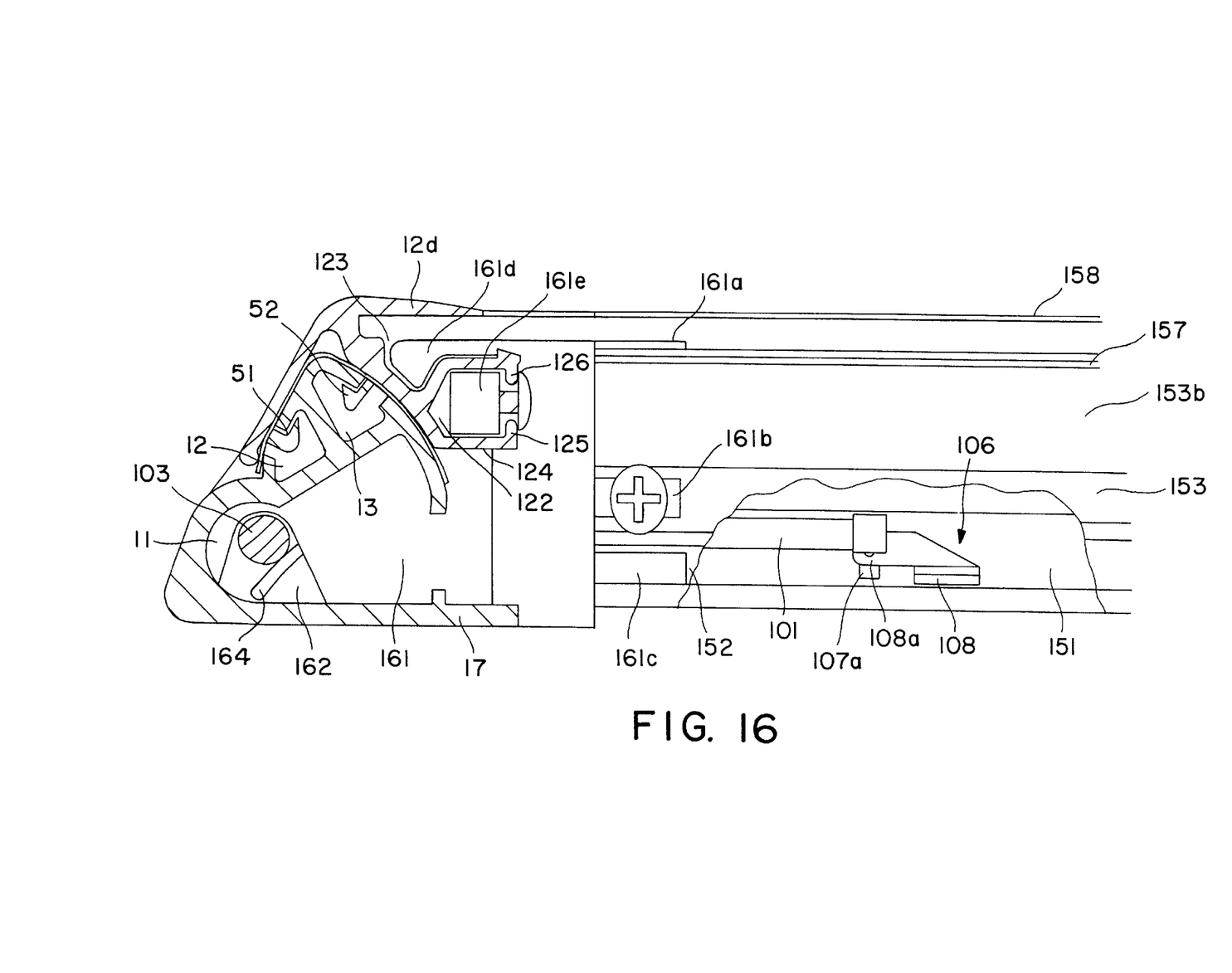
FIG. 16 is a cross-sectional and partial plan view of the front driver's side corner of the cover assembly of the present invention in the closed position.
Figure 17:
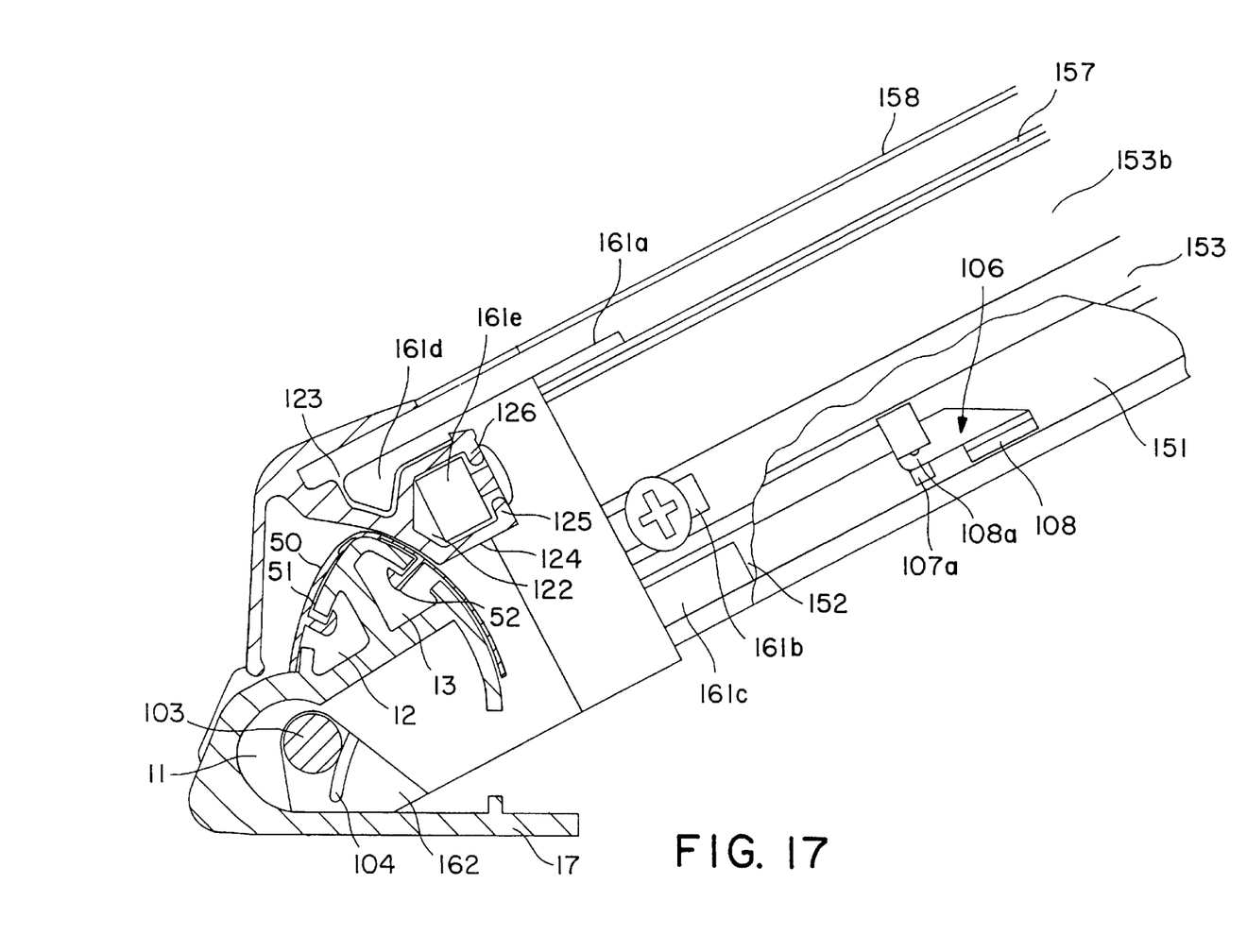
FIG. 17 is a cross-sectional and partial plan view of the front, driver's side corner of the cover assembly of the present invention when the cover is being raised from the passenger side of the vehicle.

FIGS. 13, 14 and 15 are, respectively, a top plan, and two side plan views of a corner piece 160 for securing rails 120 to rails 150. Corner piece 160 generally includes a body portion 161 with a first projection 161a, a second projection 161b, a third projection 161c, a fourth projection 161d and a fifth projection 161e extending from body 161 as shown. Projections 161a, 161b and 161c are configured so as to have the same general cross-sectional shape as channels 152, 153 and 154 of rail 150. In particular, second projection 161b includes a slot 161f therein for engaging lip 153c, as described below. Third projection 161c is a generally flat member configured to fit between walls 157 and 158 of peripheral rail 150. Fourth projection 161d is configured to fit within channel 123 of peripheral rails 120. Fifth projection 161e is similarly configured to fit within channel 122 of rails 120. The corner piece 160 shown in FIGS. 15–17 is used to secure the passenger side rail 120 to rail 150 at the front of the cargo area. An identical corner piece 160 is used to secure the passenger side rail 120 to rail 150 at the rear of the cargo area. In the corner piece 160 utilized to secure the driver side rail 120 to rail 150 at the front of the cargo area and the passenger side rail 120 to rail 150 at the rear of the cargo area, projections 161a–c are located on the face on which projections 161d and 161e are located in FIGS. 13–15, and projections 161d and 161e are located on the face of corner piece 160 on which projections 161a through 161c are shown.

Corner piece 160 further includes a channel 162 formed therein. When cover 40 is closed, torsion bars 100 rest within channel 162, as described below. A lock 163 extends through body 161 and operates a latch 164 disposed within body 161 adjacent channel 162. Latch 164, when closed, forms a hinge for pivoting cover 40 to the desired open position, as described below. If desired, a slot could be provided in each corner piece 160 to receive cover material 140 at the corners. Alternatively, cover material 140 can be cut so as to mate with the outer surface of corner pieces 160 and be glued or otherwise sealed against the outer surface.

FIG. 16 is a cross-sectional and partial plan view of the front driver's side corner of the cover assembly in the closed position. Note that end cap 110 is not shown. This view shows rail 150 secured to the left peripheral rail 120 by a corner piece 160. Cover material 140 and cushions 130 have been removed for clarity. In this view, it can be seen that projections 161a, 161b and 161c extend into rail 150. Similarly, projection 161d extends into channel 123 and projection 161e extends into channel 122 of rail 120. The corner pieces are fastened to rails 150 and 120 by inserting a screw or similar fastener through projections 161b and 161e and into rails 150 and 120 as shown. In the closed positioned, the curved juncture of segments 103 and 104 of torsion bar 100 lie within channel 162 of corner piece 160. Slide 108 and cylinder 101 rest within channel 151 of rail 150. Latch 164, in the closed position, is positioned as shown beneath the juncture of segments 103 and 104 of torsion bar 100 to hold torsion bar 100 in place. When all four latches 164 are in the position shown, latches 164 hold the cover 40 in the closed position against the tension of torsion bars 100. Note also that the weight of cover 50 compresses bearing member 50 between rails 10 and 120, thus forming a seal to keep moisture out of the cargo area. Also, rails 10 do not extend the entire length of the top rails of the cargo area in the embodiment shown. Accordingly, a foam, rubber or similar seal may be secured to the rail of the cargo area adjacent the ends of rails 10 to seal any gap between corner pieces 160 and the top rails of the cargo area when the cover is closed.

To open the cover, the user first selects the side or end of the cargo bed from which access is desired. The user then inserts a key into locks 163 in corner pieces 160 on that side or end and releases latches 164. When this occurs, the tension in the torsion bars 100 nested within those corner pieces 160 causes segments 104 to pivot upwardly. This in turn causes segments 104 to slide within cylinders 101 and cylinders 101 to pivot upwardly as well. As this occurs, slides 108 slide within channels 151 of rails 150. As cylinders 100 slide relative to segments 104 of torsion bars 100, support members 30 extend in length and raise cover 40 upwardly. While this occurs, the remaining latches 164 pivot about the juncture of segments 103 and 104 of the remaining two torsion bars 100 in channels 162 and act as a hinge to allow the cover to pivot upwardly. Thus, the cover begins to rise automatically when two of the locks 163 are released. Thus, the present invention permits the cover to be opened from which ever one of the sides or ends of the cargo bed the user desires.

FIG. 17 shows a cross-sectional and partial plan view of the front, driver's side corner of the cover assembly of the present invention when the cover is being raised from the passenger side of the cargo bed of the vehicle. Note that channel 121 of the closed side pivots about bearing 50 on rail 10 and torsion bar 100 remains secured in corner piece 160. Although not shown, torsion bar 100 at the rear driver's side corner would likewise remain secured in its corner piece 160.

Figure 18:
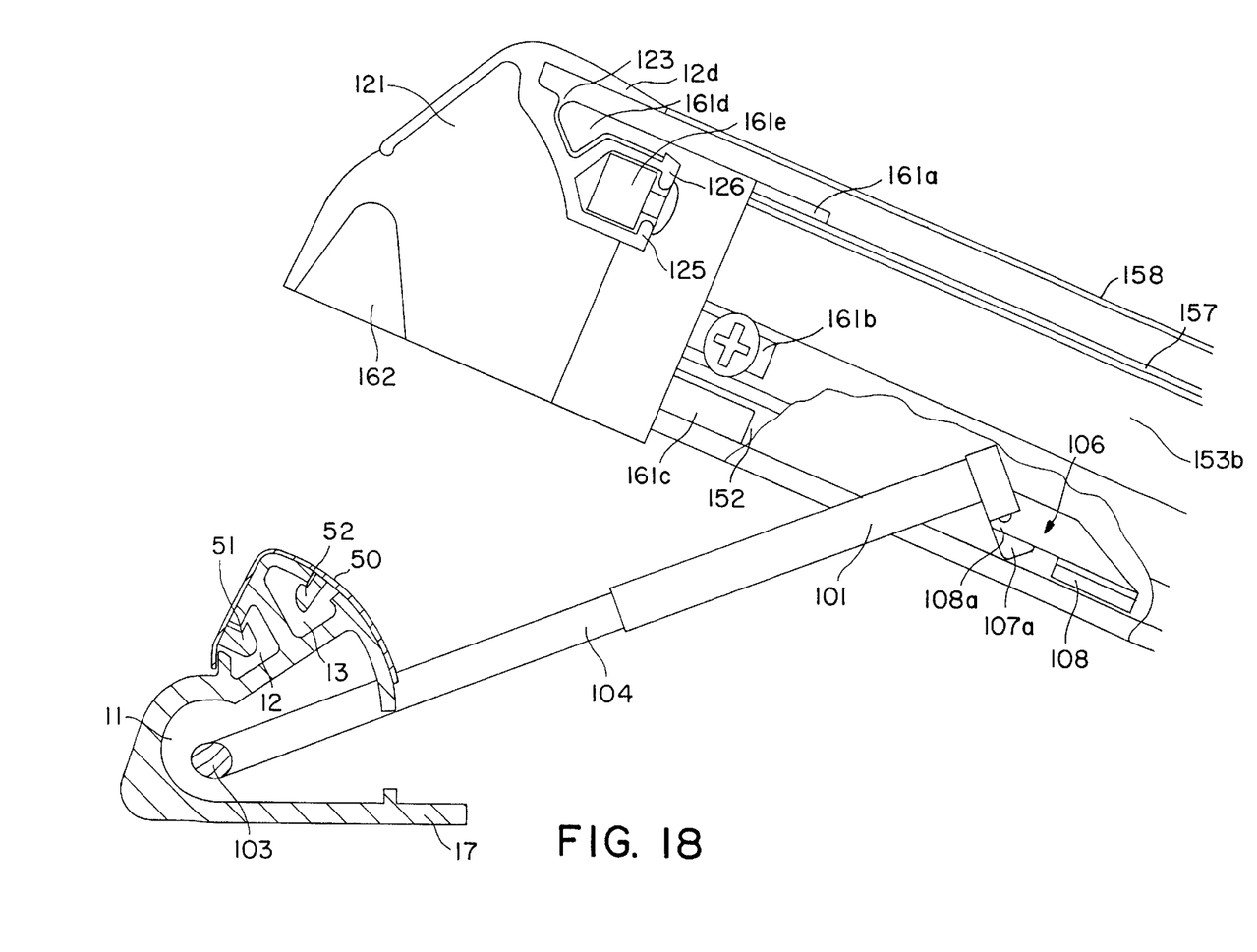
FIG. 18 is a cross-sectional and partial plan view of the front, driver's side corner of the cover assembly of the present invention when the cover is being raised from the driver's side of the vehicle.

FIG. 18 shows a cross-sectional and partial plan view of the front, driver's side corner of the cover assembly of the present invention when the cover is being raised from the driver's side of the cargo bed of the vehicle. When opened in this manner, torsion bar 100 is released from corner piece 160 and channel 121 on the right rail 120 pivots about bearing 50 on the opposite side rail 10. Similarly, torsion bar 100 at the rear driver's side corner would be released from its corner piece 160.

If desired, the cover could be raised from the rear of the cargo bed by releasing locks 163 at both rear corners. The cover could be raised from the front by releasing both locks 163 at the front corners.

To remove cover 40 from the vehicle, all four latches 164 are disengaged from their respective torsion bars 100 and cover 40 is raised to a position above the cargo area. Cover 40 is then lifted such that torsion bars 100 slide completely out of cylinders 101. If desired, a safety lock or catch can be included to prevent inadvertent removal of cover 40. For example, a cord could be secured to rails 10 and rails 120 or 150 at each corner of the cargo area. The cords could also be connected to rails 10 and corner pieces 160. The length of the cords would be such that torsion bars 100 could not be completely removed from cylinders 101 without first disengaging the cords from either rails 10 or 120.

Although the present invention has been showed and described in detail, the same is to be taken by way of illustration only and not by way of limitation. Numerous changes can be made to the embodiment shown without departing from the scope of the invention. For example, various latch and/or hinge mechanisms could be used in place of latch 164. Lock 163, could be completely eliminated. The various components, including rails 10, 120 and 150 and corner pieces 160, could be of configurations other than those shown. Accordingly, the present invention is to be limited only by the terms of the claims appended hereto.

What is claimed is:

1. A cover assembly for the cargo area of a vehicle, comprising:
    a rail adapted to be secured to the vehicle;
    a cover;
    a biasing member having a first end secured to the rail and being movable about the longitudinal axis of the rail and a second end operatively coupled to the cover and movable along the cover, and configured to apply a force to the cover; and
    a latch for selectively holding the cover in the closed position against the force of the biasing member or allowing the cover to open in response to the force of the biasing member.

2. The cover assembly according to claim 1, wherein the rail includes a channel and a portion of the biasing member extends into the channel.

3. The cover assembly according to claim 1, wherein the biasing member includes a torsion bar.

4. The cover assembly according to claim 3, further including a cylinder and wherein a portion of the torsion bar is located in the cylinder.

5. The cover assembly according to claim 1, wherein the cover is rigid.

6. The cover assembly according to claim 1, wherein the latch engages the biasing member.

7. The cover assembly according to claim 1, wherein the latch pivots about the biasing member when the cover is opened.

8. The cover assembly according to claim 1, wherein more than one side of the cover is selectively movable from a closed position adjacent a side of the cargo area of the vehicle and an open position away from a side of the cargo area of the vehicle.

9. The cover assembly according to claim 1, further including at least one safety lock to prevent inadvertent removal of the cover.

10. A cover assembly for the cargo area of a vehicle, comprising:
    a plurality of first rails adapted to be secured to the vehicle;
    a cover;
    a plurality of second rails connected to the cover such that at least one of the second rails includes a channel;
    a biasing member secured to at least one of the first rails and at least one of the second rails and movable about the longitudinal axis of said first rails; and
    a slide connected to the biasing member and located at least partially within the channel.

11. The cover assembly according to claim 10, wherein at least one of the first rails includes a channel and a portion of the biasing member extends into the channel.

12. The cover assembly according to claim 10, wherein the biasing member includes a torsion bar.

13. The cover assembly according to claim 12, further including a cylinder and wherein a portion of the torsion bar is located in the cylinder.

14. The cover assembly according to claim 10, further including a bearing member connected to each of the first rails.

15. The cover assembly according to claim 10, wherein the cover is rigid.

16. The cover assembly according to claim 10, further including at least one safety lock to prevent inadvertent removal of the cover.

17. A cover assembly for the cargo area of a vehicle, comprising:
    at least two first rails adapted to be secured to the vehicle;
    a cover having first and second opposing sides having first and second opposing ends extending therebetween;
    at least two second rails connected respectively to first and second opposing sides of the cover;
    at least two third rails connected respectively to the first and second ends opposing of the cover;
    a plurality of corner pieces disposed between the second and third rails;
    a plurality of biasing members, at least one connected to one of the first rails and one of the third rails, and movable about the longitudinal axis of said first rails; and
    a latch disposed in at least one of the corner members.

18. The cover assembly according to claim 17, wherein the biasing members include a torsion bar.

19. The cover assembly according to claim 17, further including a latch for selectively engaging at least one of the biasing members to secure the cover in the closed position.

20. The cover assembly according to claim 17, wherein releasing at least one of the latches causes the cover to open in response to the force of at least one of the biasing members.

21. The cover assembly according to claim 19, wherein releasing at least one of the latches causes the cover to open in response to the force of at least one of the biasing members.

22. The cover assembly according to claim 17, wherein the cover can be opened from any of its first and second sides and first and second ends extending therebetween by selectively releasing at least one of the latches.

23. The cover assembly according to claim 17, wherein the latches engage the biasing members and at least one of the latches pivots about a biasing member when the cover is opened.

24. A cover assembly for the cargo area of a vehicle, comprising:

at least two first rails adapted to be secured to the vehicle;

a cover having first and second sides having first and second ends extending therebetween;

a plurality of second rails connected to first and second sides of the cover;

a plurality of third rails connected to first and second ends of the cover;

a plurality of corner members disposed between the second and third rails;

a plurality of biasing members, at least one connected to one of the first rails and one of the third rails; and a latch disposed in at least one of the corner members.

25. The cover assembly according to claim 24, wherein releasing at least one of the latches causes the cover to open in response to the force of at least one of the biasing members.

26. The cover assembly according to claim 24, wherein the cover can be opened from any of its four sides by selectively releasing at least one of the latches.

27. The cover assembly according to claim 24, wherein the latches engage the biasing members and at least one of the latches pivots about a biasing member when the cover is opened.

* * * * *